(12) United States Patent
Bastiani et al.

(10) Patent No.: US 6,442,628 B1
(45) Date of Patent: Aug. 27, 2002

(54) METHOD AND SYSTEM FOR AUTOMATICALLY DETERMINING MAXIMUM DATA THROUGHPUT OVER A BUS

(75) Inventors: Vincent J. Bastiani; Lawrence J. Lamers, both of San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/300,818

(22) Filed: Apr. 27, 1999

Related U.S. Application Data (60) Provisional application No. 60/083,832, filed on May 1, 1998.

(51) Int. Cl.[7] .............................. G06F 3/00; G06F 13/00
(52) U.S. Cl. ............................. 710/60; 710/16; 710/100
(58) Field of Search ............................. 710/100, 8–19, 710/58–74

(56) References Cited

U.S. PATENT DOCUMENTS

| | | | | |
|---|---|---|---|---|
| 5,023,869 A | * | 6/1991 | Grover et al. | 370/421 |
| 5,159,465 A | * | 10/1992 | Maemura et al. | 358/405 |
| 5,490,209 A | * | 2/1996 | Kennedy | 379/97 |
| 5,491,720 A | * | 2/1996 | Davis et al. | 375/222 |
| 5,524,122 A | * | 6/1996 | Lepitre et al. | 375/222 |
| 5,701,514 A | * | 12/1997 | Keener et al. | 710/14 |
| 5,912,921 A | * | 6/1999 | Warren et al. | 375/220 |
| 5,914,959 A | * | 6/1999 | Marchetto et al. | 370/468 |
| 6,064,678 A | * | 5/2000 | Sindhushayana et al. | 370/470 |

FOREIGN PATENT DOCUMENTS

| | | | | |
|---|---|---|---|---|
| JP | 59107661 A | * | 6/1984 | H04L/1/00 |
| JP | 04234259 A | * | 8/1992 | H04N/1/32 |
| JP | 06291809 A | * | 10/1994 | H04L/29/08 |
| JP | 09331372 A | * | 12/1997 | H04L/29/08 |

\* cited by examiner

Primary Examiner—Sumati Lefkowitz
(74) Attorney, Agent, or Firm—Martine & Penilla, LLP (57) ABSTRACT

A method and system are provided for determining maximum data throughput between a host adapter and one or more target devices coupled to the host adapter through a bus. A first set of device identifying data is obtained from a target device over the bus. Then, a maximum data throughput rate is negotiated between the host adapter and the target device over the bus. Next, a second set of device identifying data is obtained from the target device over the bus at the negotiated maximum data throughput rate. Read and write tests are performed to determine the maximum data throughput rate. When the first and second sets of device identifying data are identical, the host adapter and the target device are operated over the bus at the negotiated maximum data throughput rate.

25 Claims, 8 Drawing Sheets

|  | 1-16 clocks | 17-32 clocks | 33-48 clocks | 49-64 clocks | 65-80 clocks | 81-96 clocks | 97-112 clocks | 113-128 clocks |
|---|---|---|---|---|---|---|---|---|
| D00 | 1 | toggle | toggle | toggle | toggle | toggle | toggle | toggle |
| D01 | toggle | 0 | toggle | toggle | toggle | toggle | toggle | toggle |
| D02 | toggle | toggle | 1 | toggle | toggle | toggle | toggle | toggle |
| D03 | toggle | toggle | toggle | 0 | toggle | toggle | toggle | toggle |
| D04 | toggle | toggle | toggle | toggle | 1 | toggle | toggle | toggle |
| D05 | toggle | toggle | toggle | toggle | toggle | 0 | toggle | toggle |
| D06 | toggle | toggle | toggle | toggle | toggle | toggle | 1 | toggle |
| D07 | toggle | toggle | toggle | toggle | toggle | toggle | toggle | 0 |
| D08 | 0 | toggle | toggle | toggle | toggle | toggle | toggle | toggle |
| D09 | toggle | 1 | toggle | toggle | toggle | toggle | toggle | toggle |
| D10 | toggle | toggle | 0 | toggle | toggle | toggle | toggle | toggle |
| D11 | toggle | toggle | toggle | 1 | toggle | toggle | toggle | toggle |
| D12 | toggle | toggle | toggle | toggle | 0 | toggle | toggle | toggle |
| D13 | toggle | toggle | toggle | toggle | toggle | 1 | toggle | toggle |
| D14 | toggle | toggle | toggle | toggle | toggle | toggle | 0 | toggle |
| D15 | toggle | toggle | toggle | toggle | toggle | toggle | toggle | 1 |

FIG. 7

METHOD AND SYSTEM FOR AUTOMATICALLY DETERMINING MAXIMUM DATA THROUGHPUT OVER A BUS

CROSS REFERENCE TO RELATED APPLICATION

The present application claims benefit of U.S. Provisional Patent Application No. 60/083,832, entitled "Automatic SCSI Speed Margin Testing," by Vincent J. Bastiani and Lawrence J. Lamers, filed on May 1, 1998. This application is incorporated herein by reference.

BACKGROUND OF THE INVENTION

1. Field of the Invention

This invention relates generally to computer systems, and more particularly to methods for determining maximum communication rate between devices interconnected via I/O buses in a computer system.

2. Description of the Related Art

Modern computer systems often utilize one or more buses to connect to peripheral devices to enhance its resources. For example, the resources of a computer system may be substantially increased by attaching one or more peripheral devices such as disk drives, tape drives, printers, scanners, optical drives, and the like. Generally, the peripheral devices are attached to the computer system by means of a bus (e.g., cable).

One of the most popular buses is the well known small computer systems interface (SCSI) bus, which is defined in conformity with SCSI protocols (e.g., SCSI-1, SCSI-2, SCSI-3, etc.), which are incorporated herein by reference. The SCSI protocols are designed to provide an efficient peer-to-peer I/O interface between a host computer system and its peripheral devices. The SCSI interfaces may be operated over a wide range of media and transfer rates. For example, Table 1 illustrates representative parameters for data throughput of exemplary SCSI interfaces.

TABLE 1

| Names | Number of Data Bits (Width) | Bus Speed (MHz) | Signal Type | Data Throughput (MB/sec) |
|---|---|---|---|---|
| SCSI-1 | 8 | 5 | SE | 5 |
| SCSI-2 | 8 | 5 | SE | 5 |
| Fast SCSI-2 | 8 | 10 | SE | 10 |
| Fast-Wide SCSI-2 | 16 | 10 | SE | 20 |
| Ultran SCSI | 16 | 20 | SE | 40 |
| Ultra2 SCSI | 16 | 40 | LVD | 80 |
| Ultra 160/M | 16 | 40 | LVD | 160 |

As shown in Table 1, the data throughputs of the SCSI buses vary as the number of data bits transferred, the bus speed, and the type of signal are changed. For example, the maximum data throughput (e.g., data transfer rate) of Ultran SCSI bus is four times that of SCSI-2 bus. This is because the number of data bits transferred and the bus speed of the former bus is twice that of the latter.

The signal type also affects the transfer rate as shown in Table 1. Recently, the Ultra2 SCSI specification has been adopted in the industry to provide greater data transfer rate and cable length. It defines a new Low Voltage Differential (LVD) I/O interface, which uses a pair of wires to carry a signal. This allows for faster data rate of 80 MB/sec and a longer cable (up to 12 or 25 meters depending on load) with less susceptibility to noise than traditional single-ended (SE) signaling.

As is well known in the art, an SCSI bus is generally implemented as a cable having a set of wires. For example, the SCSI-1 cable has 50 wires. Of these 50 wires, 8 wires are for data, 1 wire is for parity, 9 wires are for control, 25 wires are for ground, and the remaining wires are for power or are reserved for future use. The 8 data wires are used to carry 8 bits of data in parallel.

In general, an SCSI bus may accommodate a plurality of SCSI devices up to a number equal to the number of data bits in the SCSI bus. For example, the SCSI-2 bus may accommodate up to eight devices, of which one is usually an SCSI host adapter. The SCSI host adapter functions to convert or otherwise translate signals between the host computer and the peripheral devices.

Figure 1A:
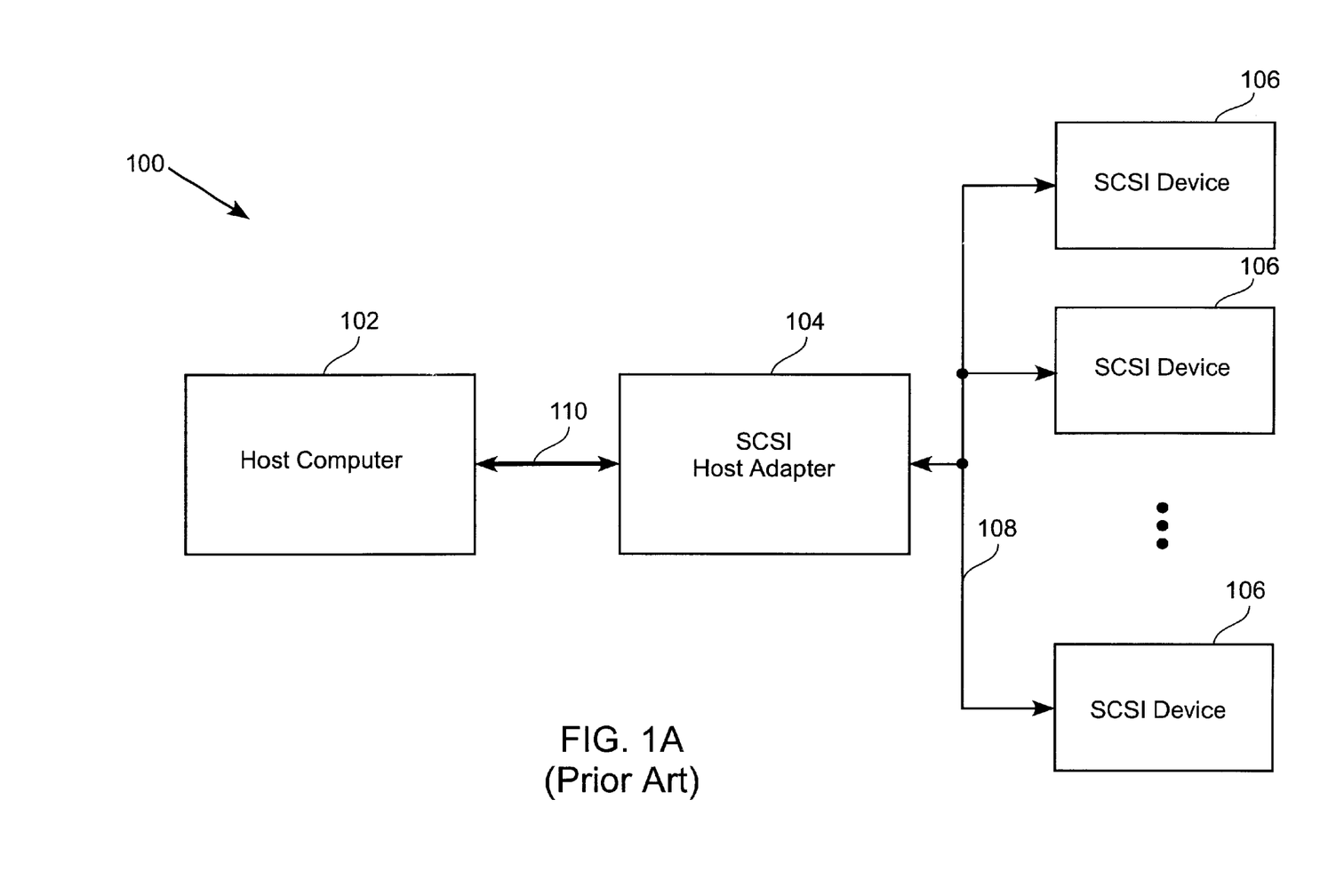
FIG. 1A illustrates a block diagram of an exemplary computer system having a host computer, an SCSI host adapter, SCSI devices, and an SCSI bus.

FIG. 1A illustrates a block diagram of an exemplary computer system 100 having a host computer 102, an SCSI host adapter 104, a plurality of SCSI devices 106, and an SCSI bus 108. The host computer 102 is coupled to the SCSI host adapter 104 by means of a host bus 110 such as PCI bus or the like. The host adapter 104 is also coupled to the SCSI devices 106 by means of the SCSI bus 108. Under the current SCSI specifications, the SCSI bus 108 may interconnect up to 7 or 15 target SCSI devices 106 to the host adapter 104 depending on the type of SCSI bus implemented. The target SCSI devices 106 may be devices such as disk drives, tape drives, printers, scanners, optical drives, or any other devices that meet the SCSI specification.

In this arrangement, the host adapter 104 controls communication between the host computer 102 and the SCSI devices 106. Specifically, the host adapter 104 is configured to receive data, address, and control signals from the host computer 102 via the host bus 110 and convert the signals into corresponding SCSI compatible data, address, and control signals. Similarly, the host adapter 104 is also configured to receive SCSI compatible data, address, and control signals from the SCSI devices 106 through the SCSI bus 108 and convert them into corresponding host-bus compatible data, addressing, and control signals.

Figure 1B:
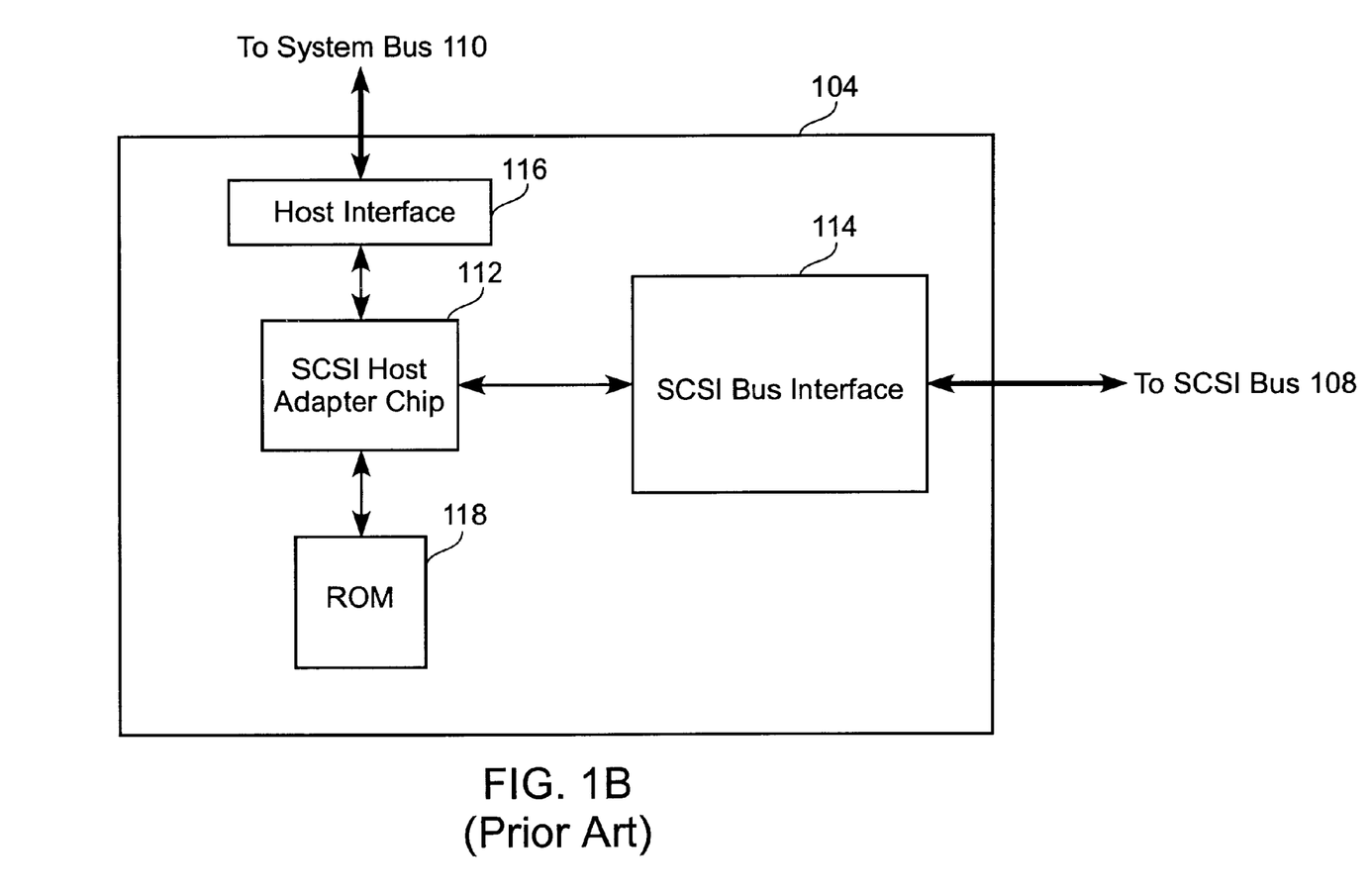
FIG. 1B is a more detailed block diagram of the host adapter having an SCSI host adapter chip, an SCSI bus interface, a host interface, and a ROM.

FIG. 1B is a more detailed block diagram of the host adapter 104 having an SCSI host adapter chip 112, an SCSI bus interface 114, a host interface 116, and a ROM 118. The host interface 116 is configured to provide a physical connection to the host bus 110. The SCSI host adapter chip 112 is configured to interface with the host and SCSI bus interfaces 116 and 114. The SCSI host adapter chip 112 is well known in the art and may be implemented, for example, by using ACI-7890A packaged semiconductor device, which is available from Adaptec Inc., of Milpitas, Calif.

The SCSI host adapter chip 112 uses the ROM 118 to store operating instructions that can be read into the memory of the host computer system 102 and executed by a host processor to communicate with the host adapter 104. The operating instructions stored within the ROM 118 typically include either a BIOS image or some other type of host-bus compatible platform operating system driver.

Currently, when the computer system 100 powers up, the SCSI host adapter 104, as initiator, interrogates the SCSI bus 108 to determine which devices are connected to the bus 108. This scan of the bus is done by the operating system module (OSM) part of the BIOS code. The interrogation consists of the initiator arbitrating for the bus, winning the arbitration, and selecting each device ID to check for a response from an associated SCSI device. If a particular ID responds, the initiator sends an INQUIRY command and the device responds with data identifying the device such as manufacturer, serial number, etc.

At boot-up, the host adapter 104 accesses the ROM 118 and attempts to recognize devices connected to the SCSI bus 108. In addition, it performs initial testing on speed and width of the SCSI bus 108 and starts boot process. However, users often connect the SCSI devices and cable in violation of SCSI specification. For example, the BIOS in the ROM 118 may be set to a speed higher than what the computer system 100 is capable of handling. As a result, the boot process fails and an error condition is generated. In response, the user manually resets the parameters to a different bus speed and/or width in the BIOS of the host adapter and reboots the computer system 100.

Unfortunately, this trial and error process imposes a substantial burden for many users in terms of time and labor needed to manually set the parameters for proper boot-up and operation. In addition, the speed thus set is often lower than what the system is capable of operating reliably. For example, users often set the parameters of host adapters to operate at a lowest possible speed (e.g., 5 MB/sec) to provide the least probability of failure. This means that the computer system may operate at less than its full capacity. Hence, the resources of the computer system are not efficiently utilized.

In view of the foregoing, there is a need for a method and system for setting data throughput parameters to provide the highest data throughput between a host adapter and a target device over a bus without requiring users to manually adjust and set bus parameters.

SUMMARY OF THE INVENTION

The present invention fills these needs by providing method and system for automatically determining maximum data throughput rate over a bus. It should be appreciated that the present invention can be implemented in numerous ways, including as a process, an apparatus, a system, a device, a method, or a computer readable medium. Several inventive embodiments of the present invention are described below.

In one embodiment, the present invention provides a method of determining maximum data throughput between a host adapter and one or more target devices coupled to the host adapter through a bus. In this method, a first set of device identifying data is obtained from a target device over the bus at a minimum data throughput rate. Then, a maximum data throughput rate is negotiated between the host adapter and the target device over the bus. Next, a second set of device identifying data is obtained from the target device over the bus at the negotiated maximum data throughput rate. When the first and second sets of device identifying data are identical, the host adapter and the target device are operated over the bus at the negotiated maximum data throughput rate.

In another embodiment, a method of setting parameters to provide maximum data throughput over a bus is disclosed. The bus is coupled between a host adapter and one or more target devices. In this embodiment, a target device is selected among the one or more target devices. Then, one or more parameters are set to specify a maximum data throughput rate. The parameters include data width, bus speed, or signal type. A write and read test is then performed at the maximum data throughput rate over the bus. Specifically, the write and read test transfers a test data pattern between the host adapter and the selected target device where the test data pattern is configured for testing signal transmission characteristics of the bus at the maximum data throughput. The write and read test determines whether the bus is capable of reliably operating at the maximum data throughput rate.

In yet another embodiment, the present invention provides a system for determining maximum data transfer speed over a bus coupled between target devices. The system includes a bus for transmitting data, a host computer, one or more target devices coupled to the bus, and a host adapter. The host computer includes a host processor and a RAM and is configured to generate one or more test patterns for testing the bus. The host adapter is coupled between the host computer and the bus for interfacing the target devices with the host computer. The host adapter is configured to set parameters to specify a maximum data transfer speed for the bus. In addition, the host adapter is further configured to select a test pattern and transmit a first copy of the test pattern to a selected target device. The selected target device is configured to transmit a second copy of the first copy to the host adapter. When the second copy is identical to the test pattern, the bus is determined to be capable of operating at the maximum data transfer rate.

By automatically determining and setting the maximum data throughput rate, the users are thus relieved from the tedious task of manually setting parameters and rebooting until the computer system boots up properly. This also means that the host adapter and target devices are ensured of operating reliably at the highest data transfer speed possible. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention, method and system for automatically determining maximum data throughput rate over a bus, is described. It will be obvious, however, to one skilled in the art, that the present invention may be practiced without some or all of these specific details. In other instances, well known process operations have not been described in detail in order not to unnecessarily obscure the present invention.

Figure 2:
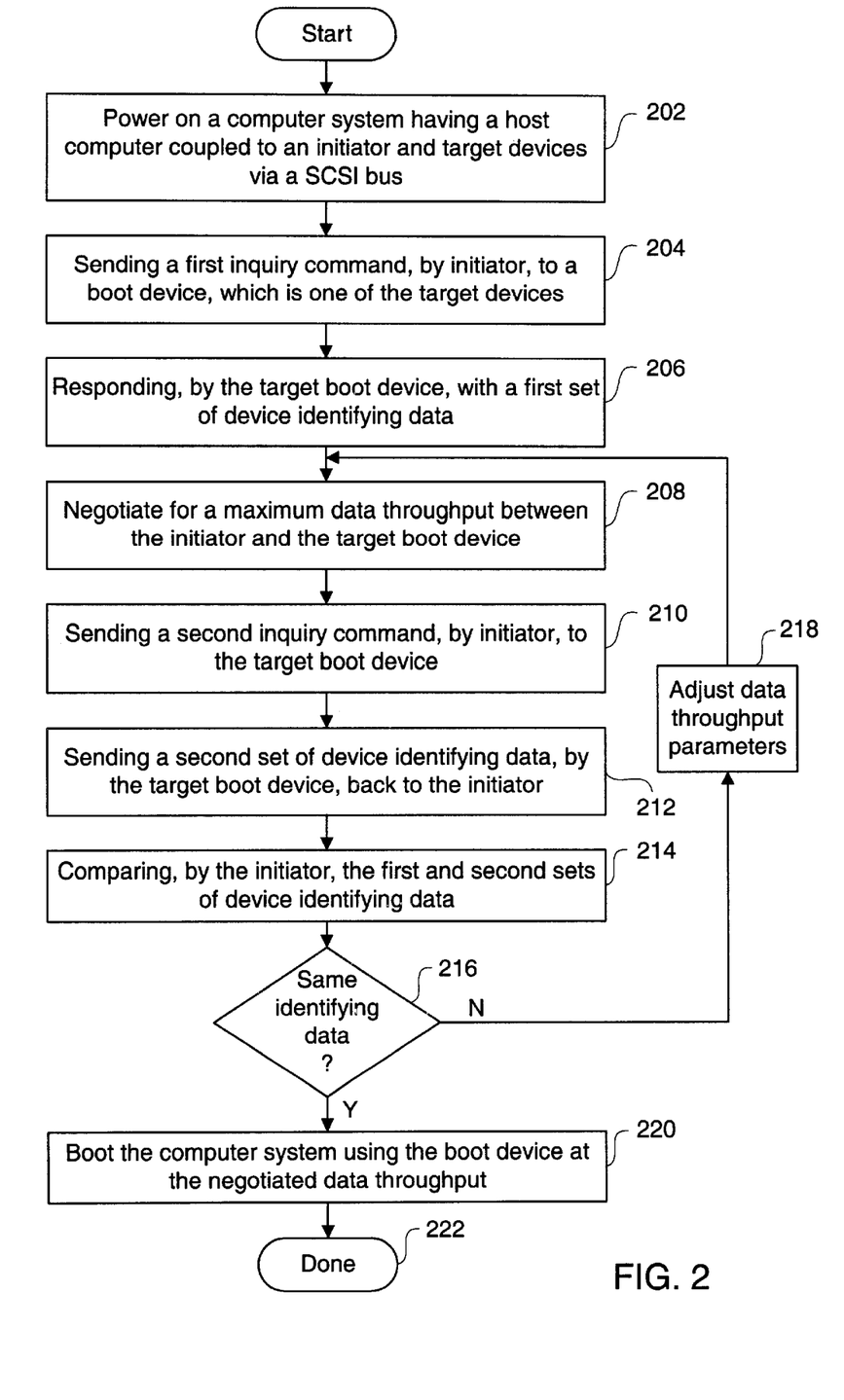
FIG. 2 illustrates an exemplary method for booting up a computer system having an SCSI initiator, an SCSI bus, and one or more target SCSI devices in accordance with one embodiment of the present invention.

FIG. 2 illustrates an exemplary method for booting up a computer system having an SCSI initiator, an SCSI bus, and one or more target SCSI devices in accordance with one embodiment of the present invention. The SCSI initiator is coupled to the target SCSI devices by means of the SCSI bus. The method begins by powering on the computer system in operation 202. The initiator (e.g., a host adapter), in operation 204, sends a first INQUIRY command over the SCSI bus to an SCSI device, which is one of the target SCSI devices. The INQUIRY command is used to perform initial read test to determine if data can be transferred from the SCSI device to the initiator. The identity of the SCSI device is kept in the BIOS of the host adapter to enable booting up upon power up. However, if the identity of the SCSI device is lost or otherwise inaccessible, the target SCSI devices may be traversed one at a time to find a device to boot from.

In response to the INQUIRY command, in operation 206, the target SCSI device sends a first set of device identifying data over the SCSI bus at a minimum data throughput rate (e.g., 8-bit asynchronous transfer). The device identifying data, typically 36 bytes long, uniquely identifies the target device and includes information such as manufacturer, serial number, etc. The initiator and the target SCSI device then negotiate for a maximum data throughput (e.g., data transfer speed) between them in operation 208. The initiator and the target SCSI device then communicate at the negotiated maximum throughput.

After the maximum data throughput has been negotiated, the initiator sends a second INQUIRY command over the SCSI bus in operation 210. The target SCSI device then transfers a second set of device identifying data to the initiator over the SCSI bus at the maximum negotiated rate in operation 212. It should be noted that the data transfers are unidirectional from the target SCSI device to the initiator.

The initiator then compares the first and second sets of device identifying data in operation 214. If the data sets are not identical, data throughput parameters such as data width, bus speed, and signal type (e.g., LVD and SE) are adjusted in operation 218 to obtain a lower data throughput. The method then proceeds back to operation 208 to negotiate a data throughput with the adjusted parameters.

On the other hand, if the device identifying data sets are determined to contain identical data in operation 216, the negotiated data throughput rate is proper. The computer system is then booted using the SCSI device in operation 220 at the negotiated data throughput. The method then terminates in operation 222.

Even after determining the maximum data throughput, the host adapter and the target device may not be able to operate at the full maximum speed due to physical variations in the SCSI bus such as a narrow segment or single-ended segment in the middle of the SCSI bus. Accordingly, after booting up the computer system, the host adapter performs a bi-directional speed margin testing with individual target devices. The maximum data throughput rate with each device is automatically determined and set in view of the physical characteristics of SCSI cable. By thus automatically determining and setting the maximum data throughput rate, the users are relieved from the tedious task of manually setting parameters and rebooting until the computer system boots up properly. At the same time, the host adapter and target devices are ensured of operating reliably at the highest data transfer speed possible.

Figure 3:
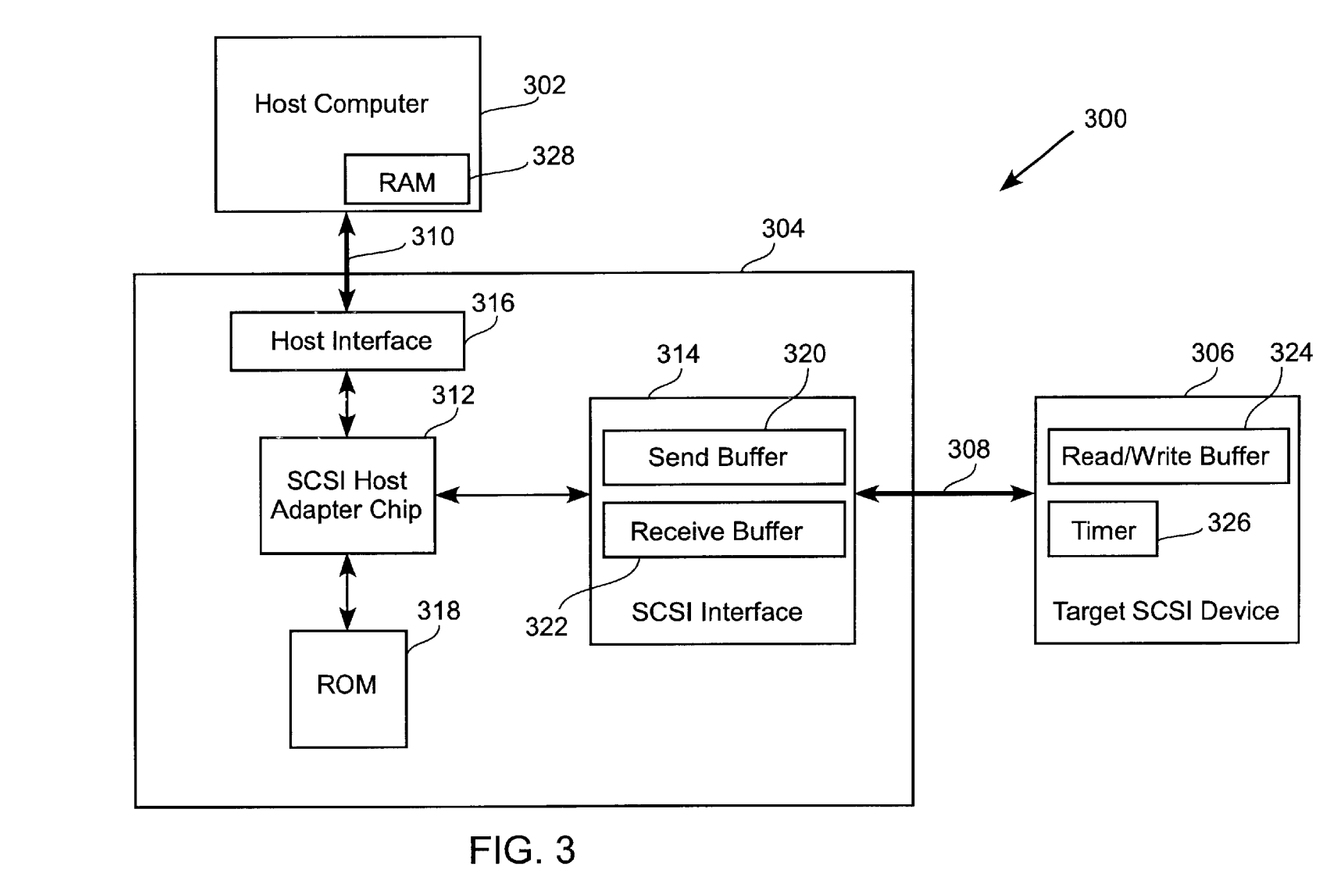
FIG. 3 illustrates a block diagram of an exemplary computer system in which the present invention may be implemented in accordance with one embodiment of the present invention.

FIG. 3 illustrates a block diagram of an exemplary computer system 300 in which the present invention may be implemented in accordance with one embodiment of the present invention. As in FIG. 1A, the computer system 300 includes a host computer 302, an SCSI host adapter 304, and one or more target SCSI devices 306. The host adapter 304 includes an SCSI host adapter chip 312, an SCSI interface 314, a host interface 316, and a ROM 318. The host interface 316 provides a physical connection to host computer 312 through a host bus 310 (e.g., PCI bus).

The host adapter 104 is coupled to the SCSI device 306 by means of the SCSI bus 308. Although the computer system is illustrated with one initiator and one target device, it should be appreciated that it may include any number of devices depending on the type of SCSI bus implemented. The target device 306 may include, but not limited to, devices such as disk drives, tape drives, printers, scanners, optical drives, or any other devices that meet the SCSI specification.

The host adapter 304 controls communication between the host computer 302 and the SCSI device 306. The SCSI host adapter chip 312 uses the ROM 118 to store BIOS and /or driver for a particular operating system. The BIOS and/or driver form a code block that implements the methods of the present invention. The code block may be loaded into a RAM 328 of the host computer 302 for execution by a host processor.

The SCSI interface 314 includes a send buffer 320 to store data to send to the target device 306 and a receive buffer 322 to store data received from the target device 306. The target device 306 includes a read/write buffer 324 to store data for communication with the host adapter 314. The host adapter 314 functions as an initiator while the SCSI device 306 acts as a target. The send and receive buffers 320 and 322 are each 128 bytes in size while the read/write buffer 324 may range from 64 KB to 2 MB in size in accordance with one embodiment of the present invention. However, the buffers 320, 322, and 324 may be any suitable size for implementing embodiments of the present invention.

In accordance with a preferred embodiment, the present invention negotiates a maximum data throughput rate and uses the buffers 320, 322, and 324 to write one or more test patterns from the send buffer 320 in the host adapter to the buffer 324 in the target device 306. The host adapter 314 then reads the content of the buffer 324 from the target device 306 for storage into the receive buffer 322. The contents of the send and receive buffers 320 and 322 are then compared to determine whether the data transfer was successful in both directions. If the contents are identical, the negotiated data throughput rate is specified to be the proper speed for the target device 306. If not, parameters are adjusted to a lower maximum throughput speed and the process is repeated until the data transfer is successful in both directions. The test pattern is thus used to test the characteristics of the bus to determine the maximum speed the bus is capable of handling. The test may be carried out with any number of test data patterns, which are preferably generated in the host computer 302 and loaded into the buffer 320 for testing. As will be discussed in more detail below, the test patterns are preferably configured to test the worst case transmission problems in SCSI cables.

As is well known in the art, the computer system 300 may hang waiting for an acknowledgement (ACK) or request (REQ) when the ACK or REQ gets lost. The target device 306 includes a timer 326 to reduce such hang time when ACK or REQ gets lost before the completion of the speed margin test. For example, the timer 326 is set to a reasonably short period of time at the beginning of every transfer from the send buffer 320 to the buffer 324 in the target device 306. If the timer 326 expires before the completion of transfer, the timer 326 triggers either restarting of the transfer of sending of extra ACK's to reduce hang time.

Figure 4:
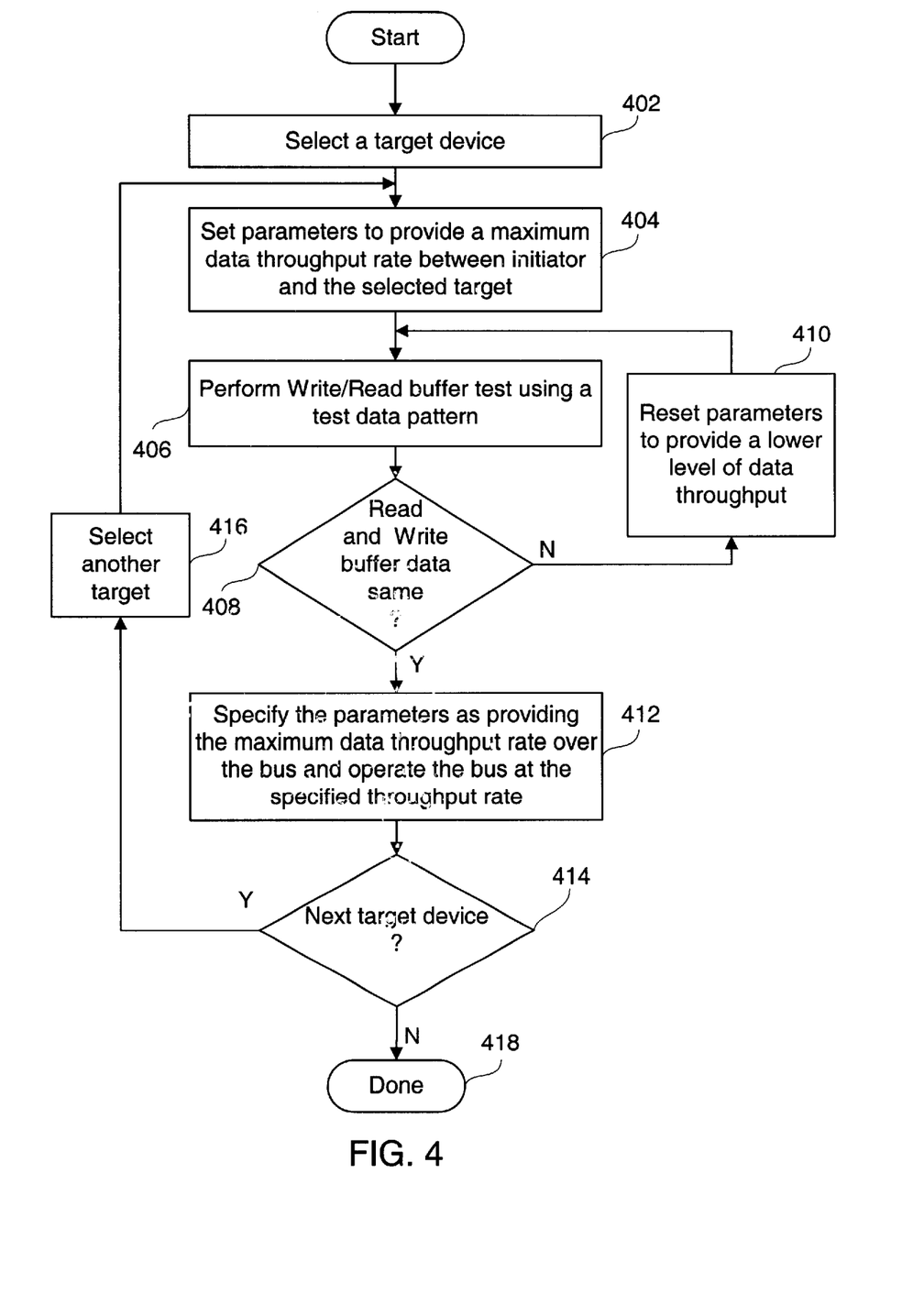
FIG. 4 shows a flowchart diagram of a method for testing an SCSI bus for determining and setting the parameters for maximum data throughput speed between a host adapter and a target device in accordance with one embodiment of the present invention.

FIG. 4 shows a flowchart diagram of a method for testing an SCSI bus for determining and setting the parameters for maximum data throughput speed between a host adapter and a target device in accordance with one embodiment of the present invention. The method may be performed as a part of the boot up process illustrated in FIG. 2 or may be performed any time after the boot up process. In this method, a target device is selected in operation 402 among a plurality of targets coupled to the SCSI bus. Then, one or more parameters are set, in operation 404, to provide a maximum data throughput rate between the host adapter initiator and the selected target.

After the maximum data throughput rate has been set, a bi-directional buffer test is performed between the initiator and the target device in operation 406. Specifically, a test pattern is written over the SCSI bus from a send buffer in the initiator to a buffer in the target device. Then, the content of the buffer in the target device is written over the SCSI bus to a receive buffer in the initiator.

The contents of the send and receive buffers in the initiator are then compared to determine whether they are the same in operation 408. If the data in the buffers are not the same, then the parameters are adjusted and reset to a lower data throughput rate in operation 410. The method then proceeds back to operation 406 to perform a new buffer test based on the newly set parameters. However, if the data in the buffers are determined to be same in operation 408, the previously set parameters are determined to provide the maximum data throughput rate over the bus.

After determining a maximum throughput rate for the selected device, it is determined in operation 414 whether another target devices needs to be tested. If so, another target is selected in operation 416 and the method proceeds back to operation 404 to determine the maximum operating throughput rate. On the other hand, if no more targets need to be tested, the method terminates in operation 418.

Figure 5:
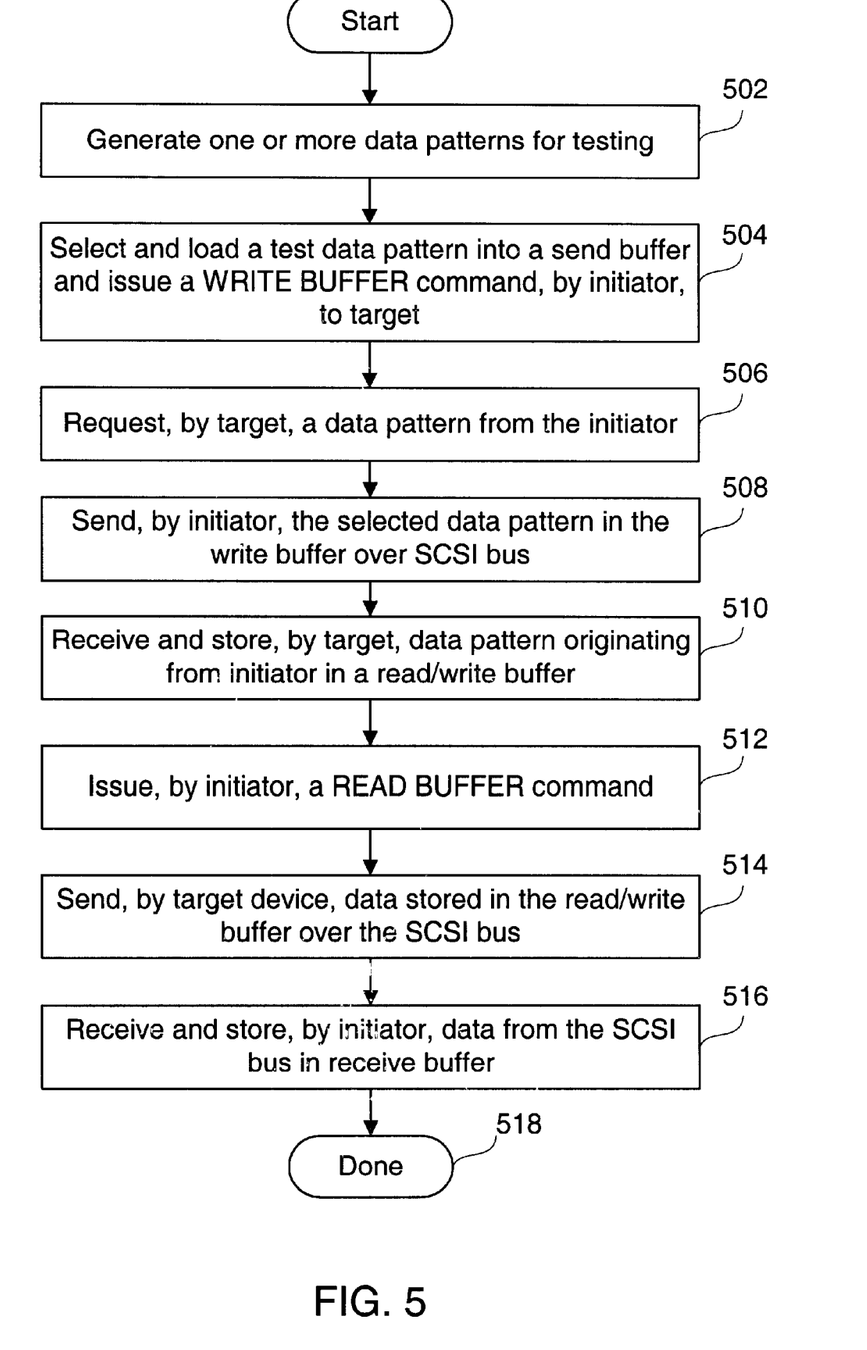
FIG. 5 shows a more detailed flowchart of a method for performing the buffer test in accordance with one embodiment of the present invention.

FIG. 5 shows a more detailed flowchart of the method operation 406 for performing the buffer test in accordance with one embodiment of the present invention. In this method, one or more test data patterns are generated for testing the SCSI cable characteristics in operation 502. Then, a test data pattern is selected and loaded into the send buffer of the initiator (e.g., host adapter), which issues a WRITE BUFFER command to the selected target device over the SCSI bus in operation 504. The WRITE BUFFER command requires the target device to request data from the initiator. In response, the target device requests data from the initiator in operation 506.

The initiator then sends the test data pattern in the write buffer to the target device over the SCSI bus in operation 508. The target device receives and stores data transferred over the SCSI bus from a read/write buffer in operation 510. After the completion of the WRITE BUFFER command, the initiator issues, in operation 512, a READ BUFFER command to read data from the target device over the SCSI bus. In response, the target device sends the data stored in the read/write buffer over the SCSI bus in operation 514. The initiator receives and stores, in operation 516, the data from the SCSI bus in the receive buffer. It should be appreciated that the method may be repeated in a similar manner for other test data patterns. The method then terminates in operation 518.

Figure 6:
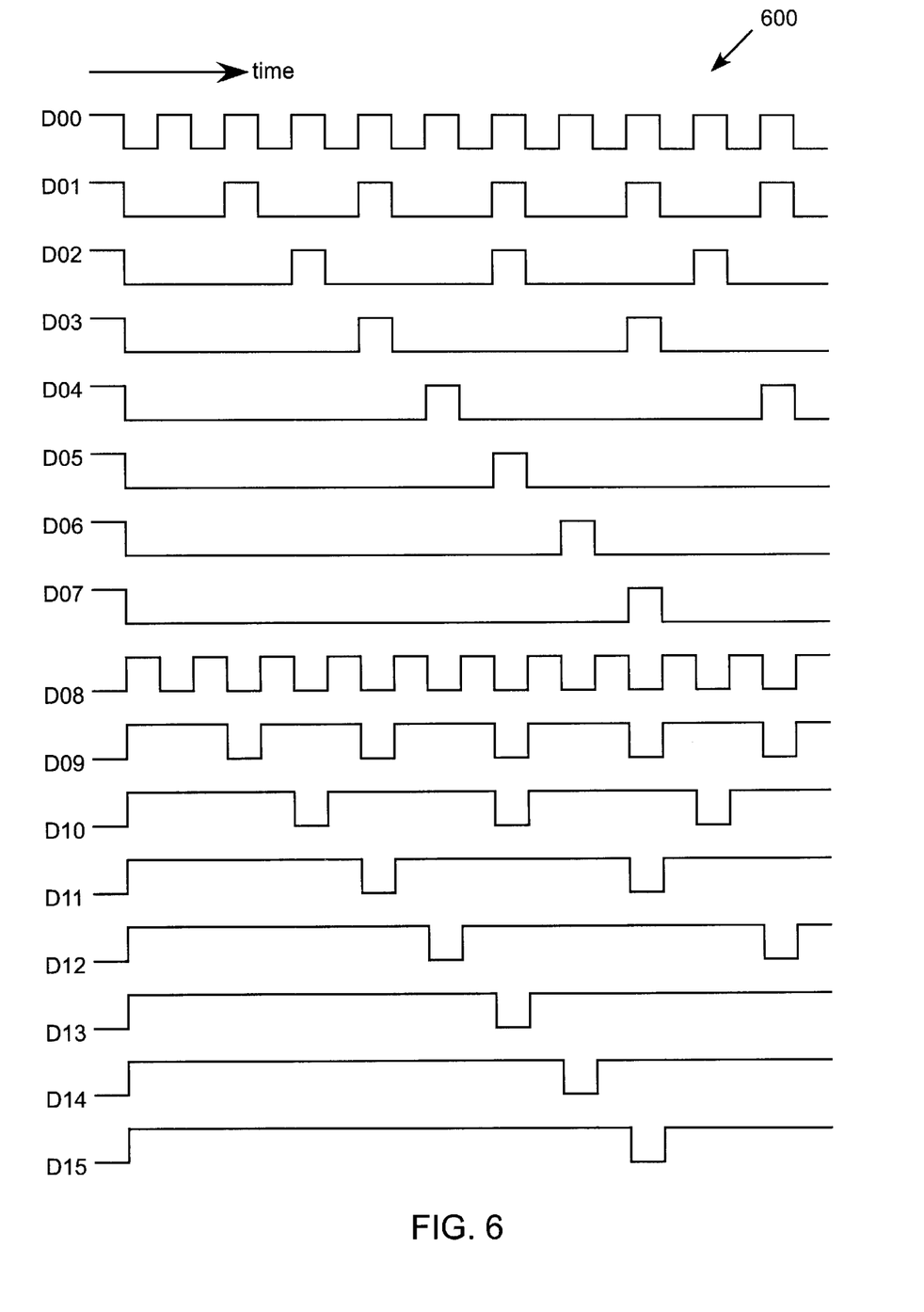
FIG. 6 illustrates a timing diagram of an exemplary test data pattern used for testing inter-symbol interference (ISI) characteristics of an SCSI bus in accordance with one embodiment of the present invention.

As discussed above, the SCSI bus can be tested using various data patterns. FIG. 6 illustrates a timing diagram of an exemplary test data pattern 600 used for testing inter-symbol interference (ISI) characteristics of an SCSI bus in accordance with one embodiment of the present invention. It is assumed that the SCSI bus has 16 data lines from D00 through D15. As can be appreciated, however, the test pattern 600 may easily be modified to apply to other data widths.

The ISI test pattern 600 provides a test data pattern for each of the data lines D00 to D15. On each data line, a single bit of one polarity is sent followed by a constant data having opposite polarity of a specified bit length. This pattern is sent repeated as needed for testing. For example, the data pattern for line D01 includes a high signal for one clock cycle followed by a low signal for three clock cycles. The ISI test pattern 600 is thus used to ensure the detection of a single pulse in an opposite direction if a line is quiescent for a long time. In one embodiment, the ISI test pattern 600 is sent eight times for a data sequence of 256 bytes for a 16-bit (e.g., 16-bit data lines) system. For an 8-bit system, the pattern may also be sent 16 times so that the same 256 bytes are sent. The sequence would thus take 256 bit times.

Figure 7:
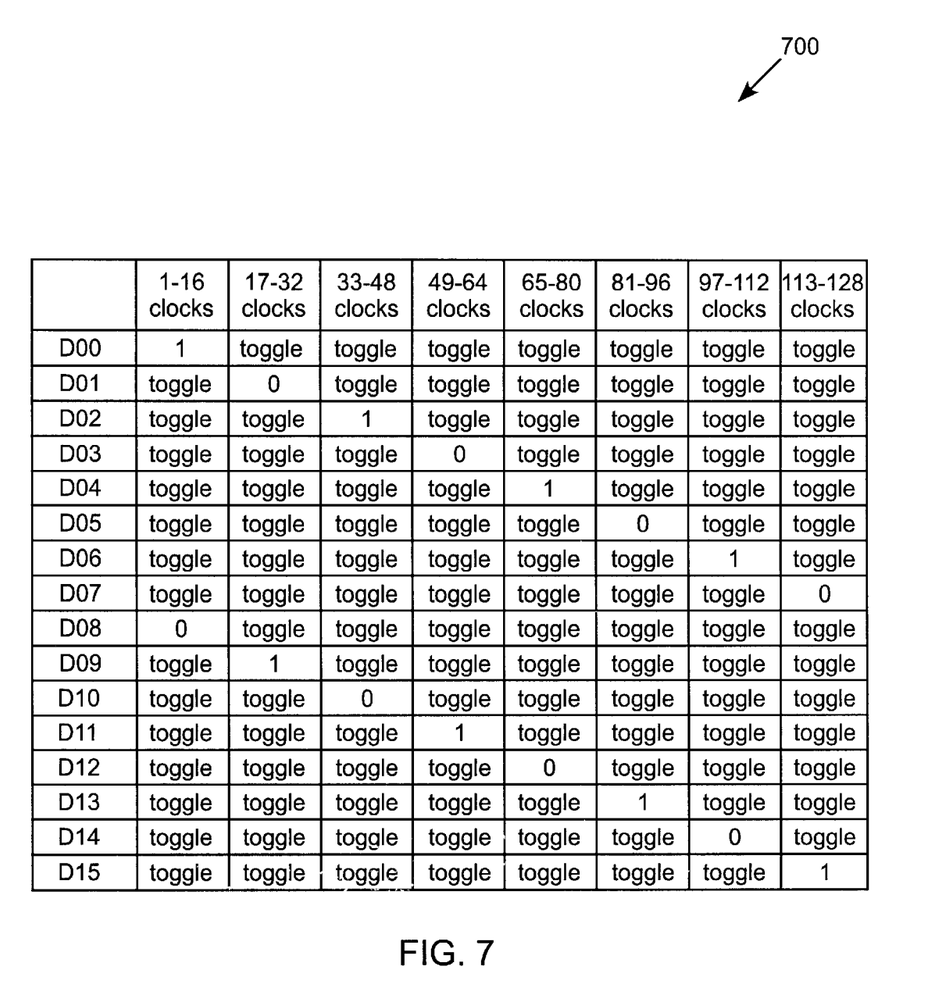
FIG. 7 shows a table depicting a test data pattern for testing cross-talk characteristics of an SCSI bus in accordance with one embodiment of the present invention.

FIG. 7 shows a table 700 depicting a test data pattern for testing cross-talk characteristics of an SCSI bus in accordance with one embodiment of the present invention. The data pattern shown assumes an SCSI bus with 16 data lines from D00 through D15. However, those skilled in the art will recognize that the test pattern may easily be modified to apply to other data widths.

The cross-talk pattern is configured to test whether the transitions on adjacent lines affect other lines. In the pattern shown in table 700, a pair of data lines is held to a constant one or zero state while the remaining fourteen lines are toggled in phase for 16 consecutive clocks. For example, data lines D00 and D08 are held in the one and zero states, respectively, and all other data lines send an alternating one-zero pattern in phase. During the next cycle, data lines D01 and D09 are held in the zero and one states, respectively, and all other data lines send an alternating one-zero pattern in phase for 16 clocks. This process is carried out for 16 cycles by changing the lines that are held constant as shown in table 1. The data pattern is repeated in such manner until all lines have been held at a constant state, which will take 8 times 16 clocks or 128 clocks. The amount of data transferred in this case will be 256 bytes in a 16-bit system and 128 bytes in an 8-bit system.

The present invention, a method and system for automatically determining maximum data throughput rate over a bus, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system, a method of determining maximum data throughput between a host adapter and one or more target devices coupled to said host adapter through a bus, said method comprising:

obtaining a first set of device identifying data from a target device over said bus at a minimum data throughput rate;

negotiating a maximum data throughput rate between said host adapter and said target device over said bus;

obtaining a second set of device identifying data from said target device over said bus at said negotiated maximum data throughput rate; and operating said host adapter and said target device over said bus at said negotiated maximum data throughput rate when said first and second sets of device identifying data are identical;

wherein said bus is a SCSI bus and said host adapter and target devices are SCSI devices.

2. The method as recited in claim 1, wherein each of said operations of obtaining said first and second sets of device identifying data comprises:

sending, by said host adapter, an inquiry command to said target device, said inquiry command requesting said device identifying data from said target device; and sending, by said target device, with said device identifying data over said bus in response to said inquiry command.

3. The method as recited in claim 1, wherein said target device is a boot device and wherein said computer system automatically boots up from said target device at said negotiated maximum data throughput rate upon power up when said first and second sets of device identifying data are identical.

4. The method as recited in claim 1, wherein when said first and second sets of device identifying data are not identical, a new maximum data throughput rate is negotiated between said host adapter and said target device, wherein a new second set of device identifying data is obtained from said target device over said bus at said new maximum data throughput rate.

5. The method as recited in claim 4, wherein said host adapter and said target device are operated over said bus at said new maximum data throughput rate is lower than the previous maximum data throughput rate.

6. The method as recited in claim 1, wherein said maximum data throughput rate is determined based on parameters including data width, bus speed, or signal type.

7. A method of setting parameters to provide maximum data throughput over a bus coupled between a host adapter and one or more target devices, said method comprising:

selecting a target device among said one or more target devices;

setting one or more parameters including data width, bus speed, and signal type, said set parameters specifying a maximum data throughput rate;

performing a write and read test at said maximum data throughput rate over said bus, said write and read test transferring a test data pattern between said host adapter and said selected target device, said test data pattern being configured for testing signal transmission characteristics of said bus at said maximum data throughput, wherein said write and read test is configured to determine whether said bus is capable of reliably operating at said maximum data throughput rate;

wherein said bus is a SCSI bus and said host adapter and target devices are SCSI devices.

8. The method as recited in claim 7, further comprising:

operating said host adapter and said selected target device over said bus at said maximum data throughput rate when said bus is determined to be capable of reliably operating at said maximum data throughput rate.

9. The method as recited in claim 7, wherein when said bus is determined to be incapable of reliably operating at said maximum data throughput rate, resetting said parameters to specify a lower data throughput rate and performing said write and read test at said lower data throughput rate over said bus.

10. The method as recited in claim 7, wherein said write and read test is performed to determine maximum data throughput rates over said bus between said host adapter and all target devices.

11. The method as recited in claim 7, wherein said host adapter includes a send buffer for storing said test data pattern and said selected target device includes a read/write buffer for storing a first transmitted version of said test data pattern from said send buffer, and wherein said host adapter also includes a receive buffer for storing a second transmitted version of said test data pattern from said read/write buffer.

12. The method as recited in claim 11, wherein when said host adapter performs said write and read test by comparing said test data pattern in said send buffer and said second transmitted version of said test data pattern, wherein said bus is determined to be capable of reliably operating at said maximum data throughput rate when said second transmitted version is identical to said test data pattern and said bus is determined to be incapable of reliably operating at said maximum data throughput rate when said second transmitted version is not identical to said test data pattern.

13. The method as recited in claim 11, wherein said operation of performing said write and read test comprises:

storing, by said host adapter, said test data pattern in said send buffer as an original test data pattern;

transmitting, by said host adapter, said original test data pattern from said send buffer over said bus to said read/write buffer in said selected target device for storage in said read/write buffer as a first test data pattern;

transmitting, by said selected target device, said first test data pattern from said read/write buffer over said bus for storage in said receive buffer as a second test data pattern;

comparing, by said host adapter, said original test data pattern in said send buffer with said second test data pattern in said receive buffer to determine whether said bus is capable of reliably operating at said maximum data throughput rate.

14. The method as recited in claim 13, wherein when said original test data pattern is identical to said second test data pattern, the bus is determined to be capable of reliably operating at said maximum data throughput rate.

15. The method as recited in claim 7, wherein said operations of setting said parameters and performing said write and read test are repeated for other target devices to determine their maximum data throughput rate over said bus.

16. The method as recited in claim 7, wherein said test data pattern is configured to test inter-symbol interference characteristics of said bus.

17. The method as recited in claim 7, wherein said test data pattern is configured to test cross-talk characteristics of said bus.

18. The method as recited in claim 7, wherein said test data pattern is configured to test both inter-symbol interference characteristics and cross-talk characteristics of said bus.

19. A system for determining maximum data transfer speed over a bus coupled between to target devices, the system comprising:

a bus for transmitting data;

a host computer including a host processor and a RAM, said host computer generating one or more test patterns for testing said bus;

a plurality of target devices coupled to said bus;

a host adapter coupled between said host computer and said bus for interfacing said target devices with said host computer, said host adapter being configured to set parameters to specify a maximum data transfer speed for said bus, said host adapter being further configured to select a test pattern and transmit a first copy of said test pattern to a selected target device, said selected target device being configured to transmit a second copy of said first copy to said host adapter, wherein said bus is determined to be capable of operating at said maximum data transfer rate when said second copy is identical to said test pattern;

wherein said bus is a SCSI bus and said host adapter and said target devices are SCSI devices.

20. The system as recited in claim 19, wherein each target device includes a first buffer for storing said first copy and said host adapter includes a send buffer for storing said test data pattern and a receive buffer for storing said second copy.

21. The system as recited in claim 20, wherein said host adapter compares said test data pattern in said send buffer and said second copy in said receive buffer.

22. The system as recited in claim 20, wherein each target device includes a timer that is set to reduce hang time in said bus.

23. The system as recited in claim 20, wherein said one or more test patterns are configured to test inter-symbol interference characteristics of said bus.

24. The system as recited in claim 20, wherein said one or more test patterns are configured to test cross-talk characteristics of said bus.

25. The system as recited in claim 20, wherein said one or more test patterns are configured to test inter-symbol interference and cross-talk characteristics of said bus.

* * * * *